United States Patent [19]

Donnelly, deceased et al.

[11] Patent Number: 4,590,047

[45] Date of Patent: May 20, 1986

[54] METHOD FOR DESULFURIZING COMBUSTION GASES

[76] Inventors: Francis M. Donnelly, deceased, late of Saint Petersburg; by Marion Y. Donnelly, heir, 4570 Overlook Dr., Saint Petersburg, both of Fla. 33703

[21] Appl. No.: 524,884

[22] Filed: Aug. 19, 1983

Related U.S. Application Data

[62] Division of Ser. No. 327,931, Dec. 7, 1981, Pat. No. 4,400,355.

[51] Int. Cl.$^4$ ............... C01B 17/00; C01B 21/00; C01B 17/82
[52] U.S. Cl. ............... 423/242; 423/235; 423/522; 423/523
[58] Field of Search ............... 423/242 R, 235, 522, 423/523, 242 A

[56] References Cited

U.S. PATENT DOCUMENTS

| | | | |
|---|---|---|---|
| 546,596 | 9/1895 | Pratt | 423/523 |
| 1,062,446 | 5/1913 | Ernst | 55/230 X |
| 3,348,830 | 10/1967 | Pearl et al. | 55/230 X |
| 3,436,192 | 4/1969 | Karlsson | 422/1969 |
| 3,501,897 | 3/1970 | Van Helden et al. | 55/73 |
| 3,531,664 | 9/1970 | Hals | 423/522 |
| 3,563,004 | 2/1971 | Schouw | 55/237 X |
| 3,581,467 | 6/1971 | Donnelly | 55/89 |
| 3,733,393 | 5/1973 | Covillaud et al. | 423/522 |
| 3,795,732 | 3/1974 | Fleming | 423/242 |
| 3,948,608 | 4/1976 | Weir | 422/169 |
| 4,005,999 | 2/1977 | Carlson | 261/125 X |
| 4,039,307 | 8/1977 | Bondor | 261/125 X |
| 4,099,925 | 7/1978 | Yanagioka et al. | 55/89 |
| 4,120,669 | 10/1978 | Amendola | 55/73 |
| 4,158,702 | 6/1979 | Archer | 55/73 |
| 4,189,309 | 2/1980 | Hoekstra | 55/73 |
| 4,251,486 | 2/1981 | Sohda | 422/170 |

*Primary Examiner*—Gregory A. Heller
*Attorney, Agent, or Firm*—Frost & Jacobs

[57] ABSTRACT

A process and apparatus for removing sulfur oxides and nitrogen oxides from the gaseous combustion products of sulfur-containing fossil fuel, such as high sulfur coal, comprising passing the combustion products into a reaction chamber, introducing atomic oxygen and air into the chamber, subjecting the resulting gaseous mixture to a plurality of confined, upwardly spiralling vortical movements in series, maintaining a reservoir of sulfuric acid in the reaction chamber, each vortical movement being of sufficient velocity as to atomize and elevate the sulfuric acid in the reservoir and to intermix it with the combustion products, impinging the vortical mixture against rapidly rotating surfaces whereby to discharge the mixture outwardly against the chamber walls to fall by gravity into the reservoir, and repeating the plurality of vortical movements in series in at least one additional reaction chamber, thereby producing sulfuric acid and/or nitrosyl sulfuric acid as a saleable by-product and reducing the sulfur oxides content of the discharged gases to a level of about 100 ppm.

10 Claims, 6 Drawing Figures

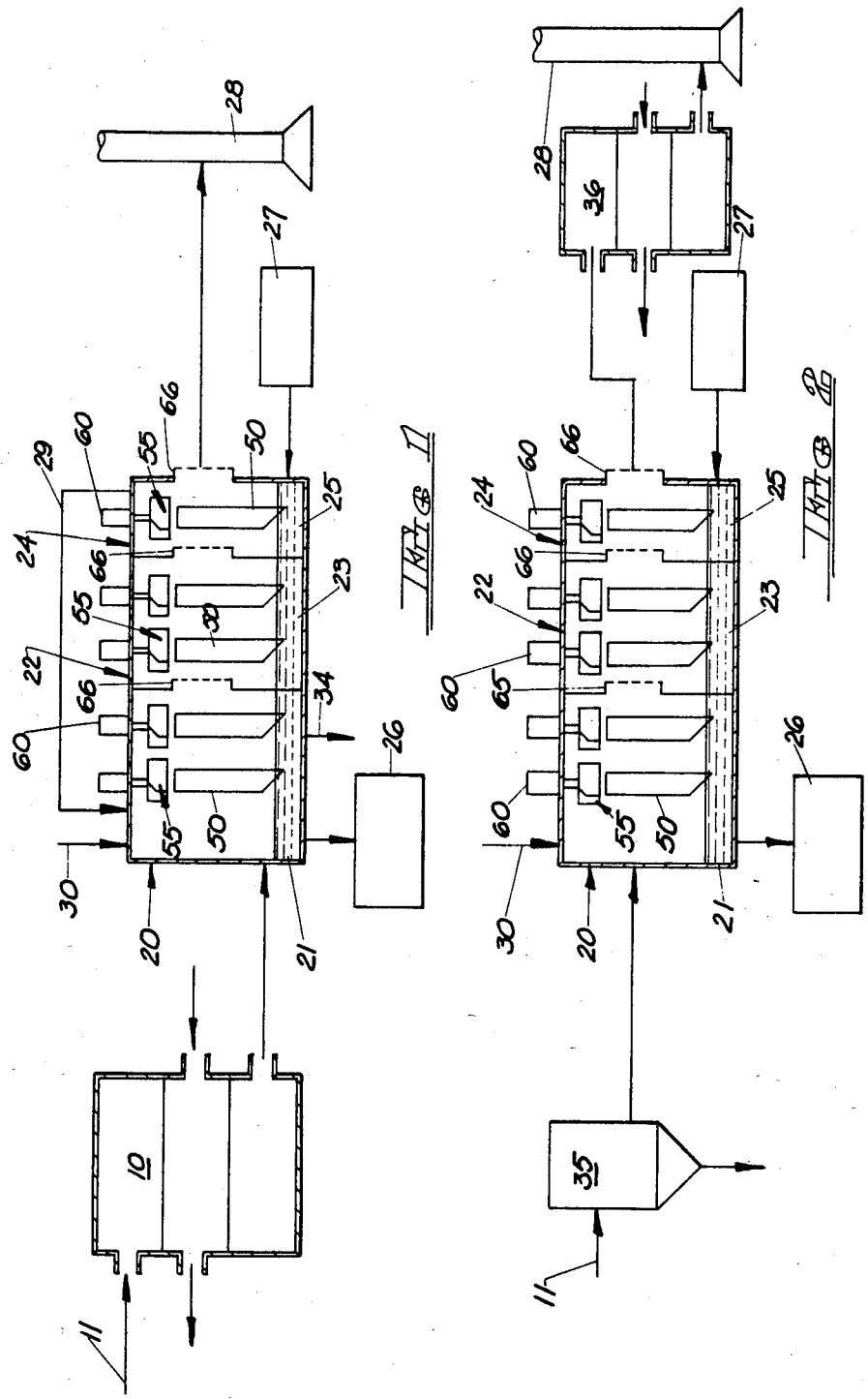

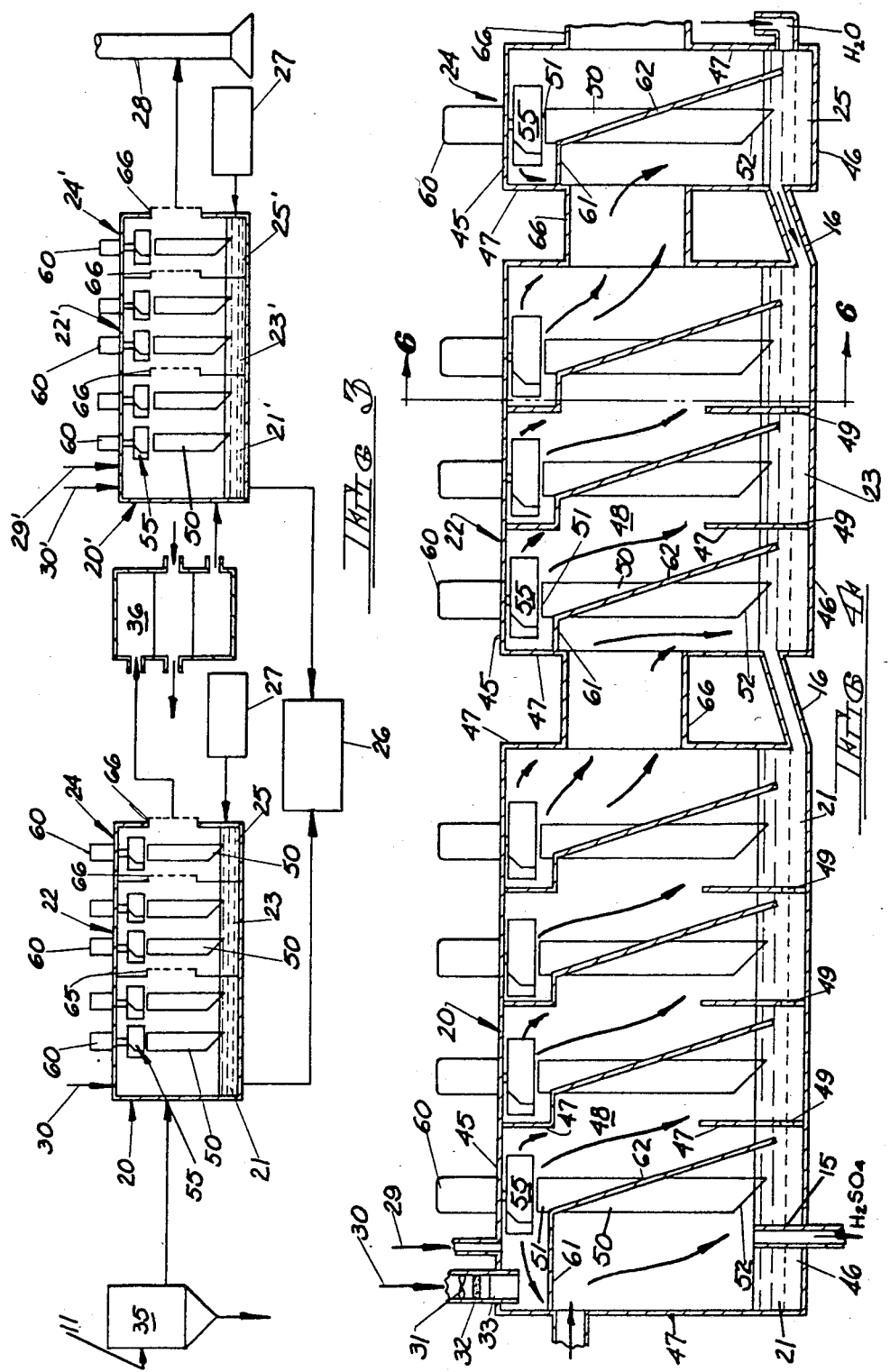

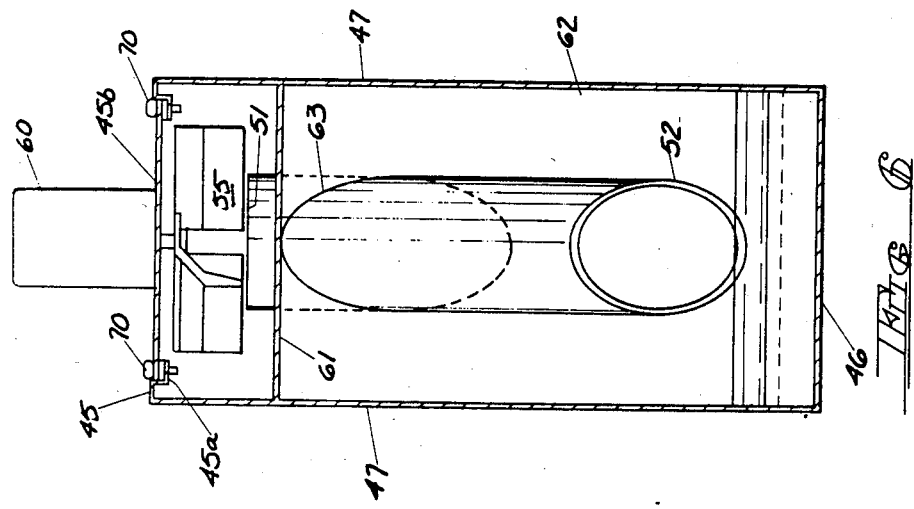
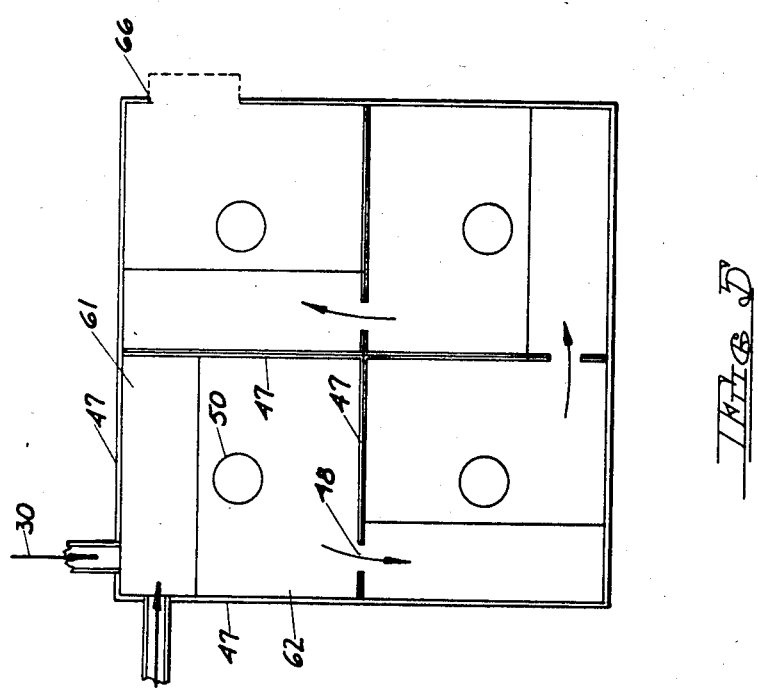

METHOD FOR DESULFURIZING COMBUSTION GASES

This is a division of application Ser. No. 327,931 filed Dec. 7, 1981, now U.S. Pat. No. 4,400,355, issued Aug. 23, 1983.

BACKGROUND OF THE INVENTION

This invention relates to the purification of waste gases, and more particularly to a method and apparatus for removing sulfur oxides and nitrogen oxides from the gaseous combustion products of sulfur-containing fossil fuel such as high sulfur coal, and to obtain by-products of commercial value which would at least partially recoup the cost of the purification apparatus and operation thereof.

Recent emphasis on air pollution control has severely limited the use of sulfur-containing coal as a source of fuel in electric generating plants, steam plants and the like, despite the fact that huge deposits of sulfur-containing coal are readily available in this country and could be substituted for the more expensive and relatively scarce alternative forms of energy such as low-sulfur coal, natural gas and petroleum. If the current stringent environmental controls on emission of sulfur oxides could be met, it would thus be possible to ameliorate energy requirements for many years by conversion to sulfur-containing coal in many stationary electrical generating and heating and power plants now using other forms of fuel, thus releasing petroleum, natural gas and low-sulfur coal for other uses to which they are better suited.

Reduction of sulfur oxide levels in flue gases to less than 100 parts per million before discharge to ambient atmosphere would go far toward making high sulfur coals acceptable as an alternative fuel source.

The problem of acid rain in some areas has received considerable publicity, and the burning of high-sulfur coal has been alleged to be a cause. Here again reduction of sulfur oxides in flue gases would have a salutary effect if in fact sulfur (and/or nitrogen) oxides are responsible for this problem.

Recent approaches to the use of high-sulfur coal as a fuel have included mixing powdered limestone with powdered coal, the calcium in the limestone reacting with the sulfur oxides resulting from combustion to form calcium sulfate, or gypsum. Aside from the fact that grinding of the coal into powder represents a substantial (and otherwise useless) expenditure of energy, the calcium sulfate byproduct has little commercial value, and it is apparently contemplated that it be disposed of as landfill. This overlooks the possibility that the landfill could decompose chemically after a few years to release heavy concentrations of sulfur oxides or other noxious sulfur compounds.

A number of proposals have been made to convert sulfur oxides in flue gases to sulfuric acid, which is of course a byproduct of value. However, these proposals generally proceed along the conventional lines of providing scrubbers with towers, fixed or mobile beds, or plates, and requiring spray nozzles, jets, pumps and the like, with resultant high initial cost and maintenance problems.

U.S. Pat. No. 4,158,702 is representative of the provision of a plurality of spray zones in which gases are contacted by a scrubbing medium in the form of droplets or mist.

U.S. Pat. No. 3,795,732 discloses a method for converting sulfur dioxide in combustion gases to sulfur trioxide by means of a vanadium pentoxide catalyst, absorbing the sulfur trioxide with lithium sulfate, and regenerating the lithium sulfate. It is alleged that reduction of sulfur oxides in stack gases to less than 130 p.p.m. can be obtained.

Fixed bed catalytic converters for removal of sulfur oxides from flue gases are disclosed in U.S. Pat. Nos. 3,436,192 and 3,501,897.

Apparatus for removal of sulfur dioxide from flue gases is disclosed in U.S. Pat. No. 4,099,925, wherein a gas dispersing plate and weir are provided for contacting the gases with an absorption liquid, together with an absorption liquid reservoir and a liquid-dropping zone.

U.S. Pat. No. 4,189,309 discloses a method of desulfurizing flue gases by means of two recirculating water systems separated by a secondary cooling stage. A further stage involves desorption of sulfur dioxide under vacuum conditions.

U.S. Pat. No. 4,120,669 discloses a process for removing sulfur oxides from waste gases wherein sulfur dioxide is partially converted to sulfur trioxide in a converter containing vanadium pentoxide as a catalyst, followed by scrubbing with a spray of concentrated sulfuric acid to absorb the sulfur trioxide. The remaining waste gases, still containing substantial levels of sulfur dioxide, are then passed to an ozone reactor to convert most of the sulfur dioxide to sulfur trioxide, again followed by scrubbing with concentrated sulfuric acid. It is alleged that sulfur oxides can be reduced to a level of about 100 p.p.m. Ozone is generated in an amount stoichiometrically equivalent to the sulfur dioxide remaining after the catalytic conversion and first scrubbing step.

U.S.D.C. Publication PB-209191 relates to a modified chamber process for making sulfuric acid from flue gases. Problems with excessive reaction times are pointed out, together with an apparent need to burn additional sulfur-free coal (for energy or as a source for nitrogen oxides as a catalyst).

U.S. Pat. No. 3,581,467, issued to the inventor in the present application, discloses a method and apparatus for atomizing and elevating liquids and entraining gases therewith having utility, inter alia, in the fields of air cleaning, chemical processes wherein gases and liquids are mixed, and scrubbing of process gases with liquids. In this patent an elongated, substantially vertical cylindrical duct is provided having orifices at the top and bottom thereof, the bottom orifice having a non-horizontal configuration, a liquid reservoir beneath the duct maintained at a level such that a portion of the non-horizontal bottom orifice is partially submerged, and fan means positioned closely above the orifice in axial alignment therewith for generating an upwardly spiralling vortex of gases within the duct with the rotational velocity of the outer rotating confines of the vortex being between 2,000 and 12,000 feet per minute. The rotational velocity of the vortex is sufficient to cause the liquid within the confines of the duct to be atomized and elevated. At the same time gases are drawn into the duct through the non-horizontal bottom orifice and entrained and admixed with the atomized liquid.

The present invention utilizes a modification of the method and apparatus of the aforesaid U.S. Pat. No. 3,581,467, as will be described in more detail hereinafter.

As is well known, sulfuric acid has been produced for many years from sulfur dioxide both by the chamber process and by the contact process. The chamber process involves conversion of sulfur dioxide to sulfur trioxide with nitrogen dioxide ($NO_2$) as a catalyst at a temperature of about 60° C. maximum. The sulfur trioxide is absorbed in water (or dilute sulfuric acid) to form sulfuric acid, and the nitrogen dioxide which has been reduced to nitric oxide (NO) can be recovered and reused. The contact process involves conversion of sulfur dioxide to sulfur trioxide in the presence of a platinum or vanadium pentoxide catalyst at a minimum temperature of about 150° C. The sulfur trioxide, which is in the form of a mist, is absorbed in concentrated sulfuric acid.

It is a feature of the present invention that modifications of either the chamber process or the contact process, or a combination of both, can be used to reduce to low levels sulfur dioxide and nitrogen oxides in large volumes of combustion gases. Even at a sulfur dioxide level of about 0.3% in the combustion gases the volume to be removed is very small in relation to the total volume of gases which must be handled. This presents problems in sizing the apparatus and in providing sufficient time for chemical reactions to occur resulting in removal of the sulfur dioxide.

It is an object of the invention to provide a method and apparatus which overcome the above problems. It is a further object to provide apparatus in the form of a module which can be coupled in series with as many like modules as may be needed to treat any required volume of combustion gases.

According to the invention there is provided a process for removing sulfur oxides from the gaseous combustion products of sulfur-containing fossil fuel, said combustion products containing sulfur dioxide, nitrogen oxides and water vapor, comprising the steps of passing said gaseous combustion products into a first enclosed chamber, introducing a supply of atomic oxygen and air into said chamber, subjecting said combustion products, atomic oxygen and air to a plurality of confined, upwardly spiralling vortical movements within said chamber in series, each upwardly spiralling vortex being generated in such manner as to produce a rotational velocity in the outer rotating confines thereof ranging between 2,000 and 12,000 feet (610 to 3,660 meters) per minute, maintaining a reservoir of sulfuric acid in said chamber, each said vortex being of sufficient magnitude to rupture the surface tension of said sulfuric acid at rest, thereby causing said vortex to atomize and elevate said sulfuric acid and to entrain and intermix said gaseous combustion products, atomic oxygen and air therewith, impinging the mixture of atomized sulfuric acid, gaseous combustion products, atomic oxygen and air in said vortex against rapidly rotating surfaces whereby to discharge said mixture outwardly and downwardly to fall by gravity into said reservoir, discharging the remaining gases from said first chamber into at least one additional chamber connected in series therewith, and repeating said steps of subjecting said mixture to said plurality of confined, upwardly spiralling vortical movements, and impinging said mixture against rapidly rotating surfaces, in said at least one additional chamber, the dwell time of said mixture in said chambers being sufficient to permit substantially complete conversion of sulfur dioxide in said gaseous combustion products to sulfur trioxide and nitrogen oxides to nitrogen dioxide, and to absorb said sulfur trioxide in said sulfuric acid, whereby to reduce the sulfur oxides content of said mixture to a level of about 100 ppm.

Apparatus in accordance with the invention includes at least one of a heat exchanger and electrostatic precipitator through which said gaseous combustion products at elevated temperature are initially passed, at least one reaction chamber in which sulfur dioxide is converted to sulfur trioxide in the presence of atomic oxygen and absorbed in sulfuric acid, and a discharge to ambient atmosphere, at least one module in each said reaction chamber, each said module comprising a confining housing, a substantially vertical duct having orifices at the top and bottom thereof and centrally located in said housing, the top orifice being horizontal, the bottom orifice having a non-horizontal configuration such that a portion of said orifice is partially submerged in a reservoir of sulfuric acid in said housing, a plurality of fan blades positioned closely above said top orifice substantially in axial alignment with said duct, at least a section of each of said fan blades functioning in the manner of backwardly inclined centrifugal blower blades when rotated rapidly, baffle means dividing said housing into inlet and outlet sections, respectively, and directing incoming gaseous combustion products toward said non-horizontal bottom orifice in said inlet section while preventing intermingling of said incoming gaseous combustion products with gaseous combustion products which have been raised in an upwardly spiralling vortex through said duct, impact against said rapidly rotating fan blades and discharged outwardly and downwardly in said outlet section to drain into said reservoir, and an outlet from said module shielded by said baffle means from said incoming gaseous combustion products.

BRIEF DESCRIPTION OF THE DRAWING

FIG. 1 is a flow diagram of an embodiment of the invention.

FIG. 2 is a flow diagram of a second embodiment of the invention.

FIG. 3 is a flow diagram of the embodiments of FIGS. 1 and 2 in combination.

FIG. 4 is a diagrammatic vertical sectional view through a series of reaction chambers embodying the invention.

FIG. 5 is a diagrammatic top view of an alternative arrangement of reaction chambers in series embodying the invention.

FIG. 6 is a vertical sectional view through a module of a reaction chamber in accordance with the invention.

DETAILED DESCRIPTION

As is well known, the chamber process for production of sulfuric acid involves the following reactions:

$$S + O_2 = SO_2 \tag{1}$$

$$2NO + O_2 \rightarrow 2NO_2 \tag{2}$$

$$SO_2 + NO_2 \rightarrow SO_3 + NO \tag{3}$$

$$SO_3 + H_2O \rightarrow H_2SO_4 \tag{4}$$

$$3SO_2 + 2HNO_3 + 2H_2O \rightarrow 3H_2SOHD\ 4 + 2NO \tag{5}$$

$$2SO_2 + NO + NO_2 + H_2O + O_2 \rightarrow 2H(NO)SO_4 \tag{6}$$

$$2H(NO)SO_4 + H_2O \rightleftharpoons 2H_2SO_4 + NO + NO_2 \tag{7}$$

The contact process involves reaction (1) above and subsequent reactions as follows:

$$2SO_2 + O_2 \rightleftarrows 2SO_3 \tag{8}$$

$$SO_3 + H_2O \rightarrow H_2SO_4 \tag{9}$$

$$SO_3 + H_2SO_4 \rightarrow H_2S_2O_7 \tag{10}$$

Reactions (4), (8) and (9) above are highly exothermic, reactions (4) and (9) being the same. This heat can be utilized to provide power for operation of the apparatus of the invention.

As indicated above, in the chamber process the gases should initially be reduced to a temperature of about 60° C. maximum, and the nitrogen oxides which act as a catalyst are present in the combustion gases. Some of the sulfur dioxide is oxidized directly by nitric acid to form sulfuric acid as indicated in reaction (5). At the same time, reactions (2), (3) and (4) are occurring in the reaction chamber. If the temperature is maintained relatively low and if excessive water is not present nitrosyl sulfuric acid (also known as nitrosulfuric acid) is formed as shown in reaction (6). This may be recovered as a final product and neutralized with ammonium and/or potassium hydroxides to form a fertilizer product. If nitrosyl sulfuric acid is heated and diluted, it decomposes to produce sulfuric acid and nitrogen oxides as shown in reaction (7). A portion of the product can thus be treated in this manner in order to regenerate nitrogen oxides as a catalyst which can then be returned to the beginning of the process. Sulfuric acid produced by the chamber process generally has a concentration of about 60% to 70%.

In the contact process reaction (9) is hampered by the fact that sulfur trioxide is not readily absorbed in water, instead forming a mist which does not settle or dissolve in water. On the other hand, if concentrated sulfuric acid is used as the absorption medium the mist is eliminated and substantially complete absorption of sulfur trioxide is obtained by reaction (10). The product, known as disulfuric or pyrosulfuric acid, reverts to sulfuric acid if water is added thereto.

The reaction of oxygen with nitric oxide to form nitrogen dioxide by reaction (2) above is reported to be relatively slow, and the equilibrium constant rate decreases with increasing temperature (Kirk-Othmer, *Encyclopedia of Chemical Technology*, Vol. 15, page 857, 3rd ed., 1981). In the chamber process this constitutes an impediment to effective catalysis of sulfur dioxide to sulfur trioxide. However, the Kirk-Othmer Encyclopedia indicates in Vol. 14, page 415 (2nd ed., 1967) that the reaction of atomic oxygen derived from ozone with the lower oxides of nitrogen is extremely rapid. Although not intending to be bound by theory, it is believed that in the modified chamber process embodiment of the present invention the introduction of atomic oxygen into the first reaction chamber results in substantially instantaneous formation of nitrogen dioxide which is immediately available to catalyze conversion of sulfur dioxide to sulfur trioxide. Since the atomic oxygen preferentially reacts with nitric oxide instead of sulfur dioxide (due at least in part to the low temperature) it is not necessary to supply atomic oxygen in amounts stoichiometrically equivalent to all the sulfur oxides and nitrogen oxides in the combustion gases.

It is further reported at page 415 (Vol. 14) of the above-mentioned Kirk-Othmer Encyclopedia that in aqueous solution sulfur dioxide reacts readily and rapidly with molecular oxygen in the presence of relatively small amounts of ozone. Thus the modified contact process embodiment of the present invention is also accelerated by what may be termed as catalytic amounts of atomic oxygen since sufficient water vapor is present in the reaction chambers (due to the vortical movements therein) to cause the system to act in the same manner as an aqueous solution. In the modified contact process embodiment the high temperature decreases the reaction rate of atomic oxygen with nitric oxide, thus permitting the atomic oxygen to react with sulfur dioxide.

Moreover, it is believed that a similar phenomenon may occur in the modified chamber process of the invention with respect to nitric oxide, due to the water vapor and atomized water present in the reaction chambers, so that the amount of atomic oxygen or ozone can be substantially less than the stoichiometric equivalent of the nitrogen oxides in the combustion gases.

Referring to FIG. 1, a flow diagram of a modification of the chamber process in accordance with the invention is illustrated. Hot combustion gases ranging from about 150° to about 170° C. enter a heat exchanger indicated generally at 10 through an inlet 11 where the temperature of the gas is reduced to a range of about 50° to 60° C. Heat exchanger 10 may be an air-to-air type which effects heat exchange at a nominal rate of 2.5 BTU per hour per square foot of radiating surface per degree temperature differential. From heat exchanger 10 the cooled gases, still containing fly ash, are introduced into a first reaction chamber indicated generally at 20. The interior walls of chamber 20 are of corrosion resistant material which may be stainless steel or a neoprene lining. As described hereinafter in more detail and shown in FIG. 4, the chamber 20 comprises a plurality of modules, four being shown by way of example, each being substantially identical in construction and arranged to receive, treat and discharge combustion gases in series. The modules can be arranged in linear fashion as shown in FIG. 4 or in the form of a square as shown in FIG. 5.

A reservoir 21 of sulfuric acid maintained at a concentration of about 70% is present in the bottom of the first chamber 20. The reservoir 21 is held at a desired depth, e.g. by a standpipe 15.

After passing in series through each of the modules in chamber 20, the gases are then passed into a second reaction chamber indicated generally at 22 in FIG. 1. As shown in FIG. 4 this may comprise a plurality of modules, for example three, identical in construction to those of the first chamber, through which the gases are passed in series. A reservoir 23 of sulfuric acid of about 40 to 45% concentration is maintained in the second chamber.

Preferably the gases are then passed through a third reaction chamber, indicated generally at 24, which may comprise one or two modules in which a reservoir 25 is maintained of sulfuric acid at a concentration of about 15% to 20%.

The sulfuric acid from the first reaction chamber, at a concentration of about 70%, is withdrawn gradually into a sulfuric acid storage chamber 26. Water is introduced into the reservoir of the last chamber 24 at a controlled rate from a water supply source indicated at 27.

All reservoirs are maintained at substantially the same levels, and flow from the last to the second and from the second to the first is provided by connecting conduits 16.

As shown in FIG. 1 the gases, which have now been reduced in sulfur oxide content to a level of about 100 ppm and maintained at a temperature preferably not exceeding about 60° C., may be discharged to atmosphere through a stack 28. A portion of the gases still containing nitrogen oxides may be recycled from chamber 24 back to reaction chamber 20 to act as a catalyst through line 29.

A source of atomic oxygen, which may be ozone produced by a silent electric discharge, or a hydrogen peroxide mist, is introduced into the first chamber 20 through an inlet 30. In FIG. 4, an inlet fan 31, a filter 32 and a silent electric discharge 33 are shown schematically.

In the embodiment of FIG. 1, fly ash will be beaten out of the gases by the action of impeller blades and collected in the sulfuric acid reservoir 21. The fly ash may be collected from the reservoir 21 in a filter trap and discharged periodically through an outlet indicated at 34 in FIG. 1.

As indicated above, in the chamber process the product in reservoir 21 can contain nitrosyl sulfuric acid if the temperature is not permitted to rise and if not diluted to a concentration of less than about 65%. Since the incoming combustion gases contain nitrogen oxides, a catalyst source is continuously being replenished, but if the amount of nitrogen oxides in the incoming gases is insufficient, it is within the scope of the invention to heat and dilute a portion of the product discharged into storage chamber 26 so as to release nitrogen oxides which may be reintroduced into chamber 20, as well as recycle from reaction chamber 24 through line 29 as described above.

FIG. 2 illustrates an embodiment of the invention which is a modification of the contact process. As shown therein incoming hot combustion gases are passed through an electrostatic precipitator indicated generally at 35 for removal of fly ash without substantial change in temperature. Thereafter the gases are passed into a first reaction chamber indicated generally at 20, which is substantially the same as that described above in the embodiment of FIG. 1, except that in the reservoir 31 the sulfuric acid is maintained at a concentration of about 93% to about 98%. Atomic oxygen is introduced into chamber 20 through inlet 30. After passage through each of the modules in series, the gases pass into the second reaction chamber indicated generally at 22 in the same manner as described above with respect to FIG. 1. In the embodiment of FIG. 2 the reservoir 23 of sulfuric acid is maintained at a concentration of about 50 to about 55%.

After passing in series through the modules of second chamber 22, the gases may be passed through a final reaction chamber indicated generally at 24 in the same manner as described above with respect to the embodiment of FIG. 1. In chamber 24 of FIG. 2 the reservoir 25 of sulfuric acid is maintained at a concentration of about 10% to about 15%.

Due to the exothermic nature of at least two of the reactions in the contact process, the gases exiting chamber 24 will be at a temperature at least as high as the incoming gases. The sulfur dioxide content will be reduced to less than 100 ppm, and the gases are passed through a heat exchanger indicated generally at 36, which may be the same as the heat exchanger indicated at 10 in FIG. 1, before final discharge to stack 28. The heat obtained from the heat exchanger in either of the embodiments of FIG. 1 or 2 may be used in the generation of electrical power for operation of the impellers in the reaction chambers, or for other purposes.

FIG. 3 represents a combined operation wherein the contact process of FIG. 2 precedes the chamber process of FIG. 1. Incoming hot combustion gases are passed through an electrostatic precipitator indicated generally at 35, followed by treatment in reaction chambers indicated generally at 20, 22 and 24 in the same manner as described above in the embodiment of FIG. 2. Atomic oxygen is introduced into chamber 20. The gases from the final chamber 24, which are still at elevated temperature, are then passed through a heat exchanger indicated generally at 36 in FIG. 3 for reduction to a maximum temperature of about 60° C. Thereafter the gases pass through reaction chambers 20', 22' and 24' wherein they are subjected to the chamber process in the same manner as described above in connection with the embodiment of FIG. 1. Atomic oxygen may be added through inlet 30'. Since the nitrogen oxides originally present in the combustion gases may not be removed in the contact process, they may still be present to act as a catalyst in the chamber process. The nitrogen oxides may be supplemented or replenished, if necessary, from the nitrosyl sulfuric acid produced in the chamber process and introduced through inlet 29'.

The combination of the modified contact process with the modified chamber process, in series, provides the following advantages:

(a) nitrogen dioxide which may be discharged in the contact process is used as a catalyst in the chamber process;

(b) removal of fly ash prior to the first reaction chamber reduces abrasion in the system;

(c) sulfur dioxide is removed more completely by the cumulative effect of the two systems;

(d) the chamber process recovers the nitrogen oxides.

In all the embodiments described above, steam may be introduced along with the combustion gases, or in any of the reaction chambers, if needed to supplement the water vapor present in the combustion gases. As explained above, the presence of water, in the form of water vapor, atomized mist or droplets, appears to be necessary for effective removal of sulfur and nitrogen oxides.

As shown in FIGS. 4 and 5, each module comprises a confining housing having square top and bottom surfaces 45 and 46, respectively, and rectangular side walls 47. A substantially vertical duct 50 is positioned in each module having a horizontal top orifice 51 and a bottom orifice 52 having a non-horizontal configuration. The length of the duct 50 and the configuration of the bottom orifice is such that the tip of the duct extends below the surface of the liquid in the reservoir of each module and a portion of the bottom orifice is thus submerged in the liquid. A plurality of rotating fan blades indicated generally at 55 is positioned closely above the top orifice substantially in axial alignment with duct 50. At least a section of each of the fan blades functions in the manner of backwardly inclined centrifugal blower blades when rotated.

An electric motor for rotating the fan blades is positioned in a housing indicated at 60 above the top 45 of each module.

A more detailed description of the structure of the duct and fan blades may be found in the above-mentioned U.S. Pat. No. 3,581,467, and the disclosure thereof is to be considered as incorporated herein by reference.

Novel baffle means is provided in each module for the purposes of supporting the vertical duct 50 and directing incoming gases toward the bottom orifice 52 while preventing intermingling of incoming gases with gases which have been raised in an upwardly spiraling vortex through the duct, impacted against the rapidly rotating fan blades 55 and discharged outwardly. As shown in FIGS. 4 and 6 the baffle means comprises a horizontal section 61 and a downwardly sloping section 62 the end of which terminates beneath the surface of the liquid in the reservoir. An oval aperture indicated at 63 in FIG. 6 is provided centrally of the downwardly sloping section 62, the aperture closely surrounding the vertical duct 50 and being connected thereto in conventional manner as by welding and the like, thereby supporting the duct 50.

The flow of gases is indicated by arrows in FIGS. 4 and 5, and it will be apparent that in each module incoming gases are directed downwardly toward the non-horizontal orifice 52, where they are entrained within the duct 50, subjected to upwardly spiraling vortical movement and caused to impact against the rapidly rotating fan blades 55 upon passage through the upper orifice 51. The gases and entrained liquid mist or droplets are thrown outwardly against the side walls 47 and coalesce or condense thereon, as well as on the baffle section 62, to return by gravity to the reservoir.

As shown in FIGS. 4 and 5, adjoining side walls 47 of modules are provided with apertures 48 of substantial size through which the gases and entrained atomized liquid pass after impacting against the rapidly rotating fan blades which discharge the mixture outwardly and downwardly. The baffle arrangement guides the mixture into each successive module in series, as illustrated diagrammatically by arrows in FIGS. 4 and 5. It will also be understood that smaller apertures are provided in adjoining side walls of modules in each chamber below the liquid surface in the reservoirs, as shown at 49 in FIG. 4, so that the liquid surfaces will be uniform throughout each chamber.

The fan blades are rotated at a speed such that the tips thereof approach, but are less than sonic velocity, in order to impart maximum impact to the rapidly rotating gases and atomized sulfuric acid from the reservoir which is also drawn upwardly along with air and atomic oxygen introduced into the first chamber. As described in the above-mentioned U.S. Pat. No. 3,581,467, a rotational velocity of the outer rotating confines of the vortex within duct 50 between 2000 and 12,000 feet per minute (610 to 3660 meters) is sufficient to cause the liquid in the reservoir within the confines of the duct to be atomized and elevated.

In the modified chamber process embodiment of the invention fly ash is not removed from the combustion gases prior to admission thereof into reaction chamber 20. As explained above, the fly ash is entrained in the upwardly spiraling vortices, caused to impact against the rotating fan blades and beaten out and collected in the reservoir 21. Since the fly ash is abrasive in nature, most of the wear in the system is concentrated on the impeller blades. For this reason, these blades, particularly in the first reaction chamber 20, are fabricated from an abrasion resistant steel, such as Duriron, Carpenter 20, or other abrasion and corrosion resistant steels covered by ASTM Standard A 529-64.

In the contact process for production of sulfuric acid, it is well known that platinum is a catalyst, but platinum is readily contaminated or poisoned. On the other hand, vanadium pentoxide is not subject to this difficulty. In the modified contact process embodiment of the present invention a catalytic chamber containing vanadium pentoxide in finely divided form on a suitable carrier is preferably positioned between the first and second reaction chambers 20 and 22, as indicated at 65 in FIG. 2. Since fly ash has been removed in the embodiment of FIG. 2, so that the abrasive effect on the rotating fan blades is minimized, it is further within the scope of the invention to provide a thin layer of platinum, by electroplating or other conventional means, on the surfaces of the fan blades so that the upwardly spiraling vortex in each module is contacted by catalytic surfaces of platinum on the fan blades, thereby extending the length of time during which the gases are subjected to catalytic action.

Preferably demisters are provided after the first, second and third reaction chambers in the chamber process embodiment as indicated at 66 in FIG. 1, and after the second and third chambers in the contact process as indicated at 66 in FIG. 2, if catalyst chamber 65 is provided between the first and second chambers. The demisters remove any particles or atomized liquids, and the catalyst chamber 65 acts as a "back-up" to the platinum catalyst layer on the fan blades.

Referring to FIG. 6, a preferred module of a reaction chamber is illustrated. The construction of such a module has been previously described generally, and hence need not be repeated. The top surface 45 in a preferred embodiment is provided with a downwardly and inwardly depending flange 45a surrounding a square aperture. A flat, square top surface indicated at 45b is provided fitting into the aperture defined by the flange 45a. The motor housing 60 is mounted on plate 45b with the shaft of the electric motor projecting downwardly therethrough. A plurality of conventional fastener members, indicated at 70 is provided to complete the assembly. Typically, the fastener members 70 may comprise thumbscrews at each corner and the mid sides having a neoprene sponge held in compression between the inwardly depending portion of flange 45a and the lower surface of plate 45b. The entire construction of walls 45, 46 and 47, as well as duct 50 and baffle means 61 and 62 are fabricated from a stainless steel resistant to corrosion by either concentrated or dilute sulfuric acid. Alternatively, the interior surfaces of the above recited elements which would come in contact with sulfuric acid may be coated with neoprene.

The dimensions of a module as illustrated in FIG. 6 may be 7 or 8 feet tall×27 inches×27 inches. A two or three horse power motor is provided within housing 60 for rotation of the fan blades 55. The fan blades may be 14 inches in diameter, and the duct 50 may be 10 inches in diameter. An assembly of four modules in line, comprising a first reaction chamber 20 as illustrated in FIG. 4 would thus measure about 7 feet in height×9 feet in length×27 inches in width. An arrangement of four modules as shown in FIG. 5 would be about 7 feet in height×about 4.5 feet×4.5 feet. It is therefore evident that modules and assemblies thereof into a first, second or third reactor chamber of the type shown in FIG. 4 can be fabricated at a central location and readily transported by truck to the remote location where it will be installed, with the number of units being multiplied in accordance with the capacity of the coal burning plant.

By way of example, a unit of the type illustrated in FIG. 4 and having the dimensions set forth above could handle conservatively 10,000 cubic feet per minute of combustion gases from a coal burning plant. If the plant burns 500 tons of coal per day, 100,000 cubic feet per minute of air would be required. Thus, ten of the units illustrated in FIG. 4 would be required. Assuming that the coal being burned contains 2% sulfur, 500 tons per day of coal would produce about 25 tons of sulfuric acid per day.

If the combustion gases are assumed to have the same volume and density as the incoming combustion air, the total heat in the combustion gases delivered to the units (based on an ambient air temperature of about 27° C. which is raised to about 175° C. at a volumetric rate of 100,000 cubic feet per minute) would by conventional calculations give a heat rate of about 29,295,000 British Thermal Units (BTU) per hour. The production of sulfuric acid results in 3,561 BTU per pound of acid produced from sulfur. At a rate of 25 tons of acid per day, this would amount to 7,420,000 BTU per hour for pure acid with a molecular weight of 98. However, since the heat of producing sulfur dioxide by burning 833.33 pounds of sulfur per hour (in 2% sulfur coal) at a rate of 3,982 BTU per pound of sulfur burned, accounts for 3,318,320 BTU consumed in the furnace, this leaves reaction heat in the conversion of sulfur dioxide to sulfuric acid in the reaction chambers of 4,101,680 BTU per hour. The theoretical temperature rise would thus be the 4,101,680 BTU per hour divided by the product of 100,000 cubic feet per minute × the factor of 1.085, which equals 37.8° F. or 21° C.

It is apparent from the above considerations that the process involves generation of substantial amounts of excess heat which can be utilized in the production of electrical power to operate the units, generation of steam or for other purposes.

While it has been pointed out above that the burning of coal results in generation of nitrogen oxides in the combustion gases, it should be recognized that the amount of nitrogen oxides so produced is dependent upon the burning temperature. The maximum production of nitrogen oxide is believed to occur at a temperature of 871° C. (1600° F.), and variation of ±100° C. in either direction would cause the amount of nitrogen oxides to decrease drastically. It is a feature of the present invention that operation of the furnace may be varied, dependent upon the embodiment being used, to obtain the desired amount of nitrogen oxides to use as a catalyst in the modified chamber process embodiment, or to eliminate nitrogen oxides substantially completely as pollutants when using the modified contact process embodiment.

In the above mentioned USDC Publication PB-209191 it is indicated that the reaction time for conversion of sulfur dioxide to sulfur trioxide in the conventional chamber process using oxygen, steam and nitrogen dioxide is less than 6 seconds. By reason of subjecting the gases in the process of the present invention to a plurality of upwardly spiraling vortical movements in series, the total dwell time of the gases in the plurality of reaction chambers is sufficient to result in substantially complete conversion of nitric oxide to nitrogen dioxide, sulfur dioxide to sulfur trioxide, and absorption of these oxides in the sulfuric acid reservoirs. Moreover, due to the impacting of the mixture of gases and entrained sulfuric acid against the rapidly rotating fan blade surfaces, a reduction in the reaction time to something substantially less than 6 seconds is believed to be obtained. In this connection, it will be recognized that the rapidly rotating fan blades impart substantial additional energy into the reaction system, thus enhancing the previously described effect of atomic oxygen in amounts less than stochiometric equivalents of the nitrogen oxides and sulfur oxides which are being oxidized to nitrogen dioxide and sulfur trioxide, respectively. It is thus a feature of the invention that atomic oxygen can be provided in what may be termed catalytic amounts with reliance on the additional energy imparted into the system by the rapidly rotating fan blades to ionize the molecular oxygen present in the mixture of gases and thereby accelerate the oxidation reactions which must occur. Small scale experimental tests have indicated in a qualitative manner that either ozone or hydrogen peroxide in catalytic amounts are effective in converting sulfur dioxide to sulfur trioxide in less than 2 seconds. However, it is within the scope of the invention to provide atomic oxygen in stoichiometric amounts although this would increase the cost of operation.

Examples of typical results which can be expected from the modified chamber process and the modified contact process embodiments of the present invention are set forth below, based on a unit having an incoming gas capacity of 10,000 cubic feet per minute, obtained by burning 50 tons per day of 2% sulfur coal.

In Example 1 additional nitrogen oxides may be admitted into the first reaction chamber if desired by heating 250 cubic feet per minute of air to a temperature of 871° C. per minute. The level of $NO_x$ in the exhaust gas vented to a stack could be reduced by controlling the temperatures in the second and third reaction chambers to a maximum of about 60° C. as is done in the first reaction chamber.

In Example 2, it will be noted that both the sulfur dioxide and nitrogen oxide contents of the exhaust gas vented to a stack are at very low levels, viz., 80 and 10 ppm respectively. This indicates that the nitrogen oxides in the incoming flue gases are rapidly oxidized to nitrogen dioxide by ozone and absorbed as nitric acid in the reservoirs of the reaction chambers in the same manner as the sulfur oxides. Hence, effective removal of both sulfur oxides and nitrogen oxides can be achieved in all embodiments of the present process.

EXAMPLE 1

Modified Chamber Process

Flue gases—10,000 CFM at 150°–175° C.

| Analysis (volume %) | |
|---|---|
| $SO_2$ | 0.3% |
| $H_2O$ | 7.0 |
| $NO_x$ | 0.062 |
| $CO_2$ | 14.5 |
| $O_2$ | 3.0 |
| $N_2$ | 74.9 |
| Fly ash | 0.15 |

Heat exchanger—9,300 CFM air at 21° C.
  reducing flue gases to a maximum of 60° C.
Ozone generator—2,000 CFM air at 21° C.
  producing 0.19 lb/min of $O_3$
$NO_x$ generator (optional) 250 CFM air at 21° C.
  heated to 871° C. producing $NO_x$
First reaction chamber (4 modules)

discharging 3.5 lbs/min 70% $H_2SO_4$
discharging 12,180 CFM gases at 75° C.
Second reaction chamber (3 modules)
45% $H_2SO_4$ in reservoir
discharging 12,180 CFM gases at 82° C.
Third reaction chamber (1 module)
18% $H_2SO_4$ in reservoir
2.8 lbs/min $H_2O$ incoming
discharging 12,180 CFM gases at 85°–92° C.

| Analysis (volume %) | |
|---|---|
| $SO_2$ | 0.017% |
| $H_2O$ | 5.25 |
| $NO_x$ | 0.003 |
| $CO_2$ | 12.0 |
| $N_2$ | 75.2 |
| $O_2$ | 7.5 |
| Fly ash | 0.002 |

EXAMPLE 2

Modified Contact Process

Flue gases—10,000 CFM at 150°–175° C.

| Analysis (volume %) | |
|---|---|
| $SO_2$ | 0.3% |
| $H_2O$ | 7.0 |
| $NO_x$ | 0.062 |
| $CO_2$ | 14.5 |
| $O_2$ | 3.0 |
| $N_2$ | 74.9 |
| Fly ash | 0.15 |

Electrostatic precipitator (1.0 microns and larger)
reducing fly ash to 0.0082%
Ozone generator—2,000 CFM air at 21° C.
producing 0.19 lb/min of $O_3$
First reaction chamber (4 modules)
discharging 3.5 lbs/min 96% $H_2SO_4$
discharging 12,000 CFM gases at 160°–188° C.
Second reaction chamber (3 modules)
52% $H_2SO_4$ in reservoir
discharging 12,000 CFM gases at 170°–195° C.
Third reaction chamber (1 module)
11% $H_2SO_4$ in reservoir
2.8 lbs/min $H_2O$ incoming
discharging 12,000 CFM gases at 138°–155° C.

| Analysis (volume %) | |
|---|---|
| $SO_2$ | 0.008% |
| $NO_x$ | 0.001 |
| $H_2$ | |
| $CO_2$ | |
| $N_2$ | remainder |
| $O_2$ | |
| Fly ash | |

In Examples 1 and 2 above, the amount of ozone is substantially less than stoichiometric equivalents of the nitrogen oxides and sulfur dioxide. Input of 0.19 lb. ozone per minute for 10,000 cfm combustion gases containing 0.3% $SO_2$ and 0.062% $NO_x$, is equivalent to about 27% of the ozone needed to react completely with all the $NO_x$ and about 5% of that needed to react completely with all the $SO_2$.

I claim:

1. A process for removing sulfur oxides from heated gaseous combustion products resulting from the burning of sulfur-containing coal, said combustion products containing sulfur dioxide, nitrogen oxides, water vapor and fly ash, comprising the steps of:
    (a) passing said heated gaseous combustion products through an electrostatic precipitator for removal of fly ash;
    (b) introducing said gaseous combustion products into an enclosed reaction chamber at a temperature of at least about 150° C.;
    (c) maintaining a reservoir of sulfuric acid in the bottom of said reaction chamber;
    (d) introducing atomic oxygen and air into said chamber, said atomic oxygen being introduced in an amount less than the stoichiometric equivalent of said sulfur dioxide and nitrogen oxides;
    (e) subjecting said combustion products, atomic oxygen and air in said chamber to a plurality of confined, upwardly spiralling vortical movements in series at a rotational velocity of 2,000 to 12,000 feet (610 to 3,660 meters) per minute, each vortex being of sufficient magnitude to rupture the surface tension of the sulfuric acid in said reservoir, thereby causing said vortex to atomize and elevate said sulfuric acid and to entrain and intimately intermix said gaseous combustion products, atomic oxygen and air therewith;
    (f) impacting the mixture at the top of each vortex against rapidly rotating surfaces whereby to discharge said mixture outwardly to fall by gravity into said reservoir, thereby converting sulfur dioxide to sulfur trioxide and absorbing said sulfur trioxide in said sulfuric acid;
    (g) discharging the remaining gases from said reaction chamber into at least one additional enclosed reaction chamber connected in series therewith; and
    (h) repeating steps (e) and (f) in said additional reaction chamber, the dwell time of said mixture in said chambers being sufficient to permit substantially complete conversion of sulfur dioxide to sulfur trioxide and absorption of said sulfur trioxide in said sulfuric acid, whereby to reduce the sulfur oxide content of the discharged remaining gases to a level of about 100 ppm.

2. The process claimed in claim 1, wherein said rapidly rotating surfaces are fan blades which generate said upwardly spiralling vortical movements, said fan blades being rotated at a speed such that the tips thereof approach but are less than sonic velocity.

3. The process claimed in claim 2, wherein each said upwardly spiralling vortex is generated in a substantially cylindrical vertical duct having orifices at the top and bottom thereof, the bottom orifice having a non-horizontal configuration such that a portion of said non-horizontal orifice is submerged in said reservoir of sulfuric acid, and wherein said fan blades are positioned closely above said top orifice substantially in axial alignment with said duct, at least a section of each of said fan blades functioning in the manner of backwardly inclined centrifugal blower blades.

4. The process claimed in claim 1, including the step of passing said combustion products through finely divided vanadium pentoxide particles supported on a carrier subsequent to passage through the first said reaction chamber.

5. The process of claim 1 wherein the sulfuric acid in the first said reaction chamber is maintained at a concentration of about 93% to 98% by introduction therein of less concentrated sulfuric acid from said additional reaction chamber.

6. The process of claim 1, wherein said atomic oxygen is derived from ozone or hydrogen peroxide.

7. The process of claim 1, wherein said rapidly rotating surfaces are coated with a platinum catalyst.

8. The process of claim 1, wherein temperatures are maintained in said chambers so as to retard reaction of said nitrogen oxides with said atomic oxygen, and including the following subsequent steps:
  (i) reducing the temperature of the remaining gases from said additional reaction chamber to a maximum of about 60° C.;
  (j) introducing said gases into a further enclosed reaction chamber; and
  (k) repeating said steps (c) through (h), thereby converting sulfur dioxide to sulfur trioxide by the catalytic action of nitrogen oxides.

9. The process of claim 8, wherein said nitrogen oxides react to form nitrosyl sulfuric acid in said further enclosed reaction chamber, and wherein said nitrosyl sulfuric acid is collected in the bottom of said chamber along with sulfuric acid of about 65% to 70% concentration.

10. The process of claim 8, wherein said nitrogen oxides react to form nitrosyl sulfuric acid in said further reaction chamber, and including the steps of diluting said nitrosyl sulfuric acid in a subsequent reaction chamber and permitting the temperature to rise therein thereby decomposing said nitrosyl sulfuric acid and regenerating said nitrogen oxides, and recycling said regenerated nitrogen oxides to said further reaction chamber to act as a catalyst.

* * * * *